(12) United States Patent
Ota et al.

(10) Patent No.: US 6,441,993 B1
(45) Date of Patent: Aug. 27, 2002

(54) CASSETTE HOLDER

(75) Inventors: Shuichi Ota, Saitama; Takashi Katoku, Tokyo, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/707,839

(22) Filed: Nov. 8, 2000

(30) Foreign Application Priority Data

Nov. 12, 1999 (JP) ............................................ 11-322249

(51) Int. Cl.[7] .............................................. G11B 15/675
(52) U.S. Cl. ....................................................... 360/96.5
(58) Field of Search ........................................ 360/96.5

(56) References Cited

U.S. PATENT DOCUMENTS 5,214,548 A * 5/1993 Nakanishi .................. 360/96.5
5,289,324 A * 2/1994 Katoku et al. ............. 360/96.5

* cited by examiner

*Primary Examiner*—Robert S. Tupper
(74) *Attorney, Agent, or Firm*—Rader, Fishman & Grauer PLLC; Ronald P. Kananen, Esq.

(57) ABSTRACT

Disclosed is a cassette holder for inserting therein a tape cassette formed so that a front lid for opening and closing the front of a part of a tape-like recording medium located so as to traverse the front of a cassette shell accommodating therein tape reels having wound therearound the tape-like recording medium, the front lid is rotatable upward and movable rearward when the lid is opened to open the front of the tape-like recording medium, the cassette holder for mounting the tape cassette in a predetermined mounting position in a recording/playback apparatus. The cassette holder includes a lid-pressing member for pressing forward an end of the front lid when the tape cassette is to be removed from the cassette holder.

4 Claims, 16 Drawing Sheets

CASSETTE HOLDER

BACKGROUND OF THE INVENTION

1. Field of the Invention

The present invention relates to cassette holders. More particularly, the present invention relates to a cassette holder having a simplified mechanism for moving forward a front lid when the lid is being closed, and for allowing the front lid to be moved forward in a stable manner.

2. Description of the Related Art

With increases in recording density in tape cassettes, a technique has been used for covering a portion of a tape-like recording medium, which is exposed from a cassette shell during nonuse with a covering member called a "lid" so that the lid prevents dust from adhering to the tape-like recording medium and also prevents oil from adhering thereto due to contact with a part of the human body.

In a conventional tape cassette, the front of the tape-like recording medium is disposed in a manner so as to traverse the front of a mouth, which is provided at the front of the cassette shell, and opens forwardly, upwardly, and downwardly, and is covered by a front lid, the front lid rotated upward by approximately 90 degrees during use so as to expose the tape-like recording medium therein.

In the above conventional tape cassette, since the front lid is merely rotated upward by approximately 90 degrees when opening the front lid, the upper part of the mouth is still covered by the front lid; access to various components disposed in the mouth is thereby restricted during use. For example, the size or inclination of a head drum, at least a part of which is located in the mouth during use, is restricted.

In view of the above, not only may the rotation of the front lid upward to open the front of the tape-like recording medium be contemplated, but also the rearward movement of the front lid may be contemplated so that the upper part of the mouth is opened when the lid is opened.

If the front lid is rotated upward and is moved rearward as the lid is opened, a-device is required to move the front lid forward when the lid is being closed so as to cover the front of the tape-like recording medium.

SUMMARY OF THE INVENTION

Accordingly, it is an object of the present invention to provide a simple mechanism for moving a front lid forward when the lid is being closed, and to allow the front lid to be moved forward in a stable manner.

In order to achieve the above objects, a cassette holder according to the present invention is provided with a lid-pressing member for pressing forward a central part of the front lid when a tape cassette is removed from the cassette holder.

Therefore, in the cassette holder of the present invention, by the provision of a simple mechanism so that the cassette holder is provided with the lid-pressing member, the front lid can be moved forward when the tape cassette is removed from the cassette holder. Moreover, since the lidpressing member presses the central part of the front lid, a force for moving the front lid forward is equally applied at both sides of the front lid, whereby the front lid is moved forward in a stable manner.

The assignee of the present application previously filed the following two related applications.

(1) Japanese Patent Application No. 11-145535 (US counterpart of this application is now pending)

(2) Japanese Patent Application No. 11-145533 (US counterpart of this application is now pending)

DESCRIPTION OF THE PREFERRED EMBODIMENTS

Figure 1:
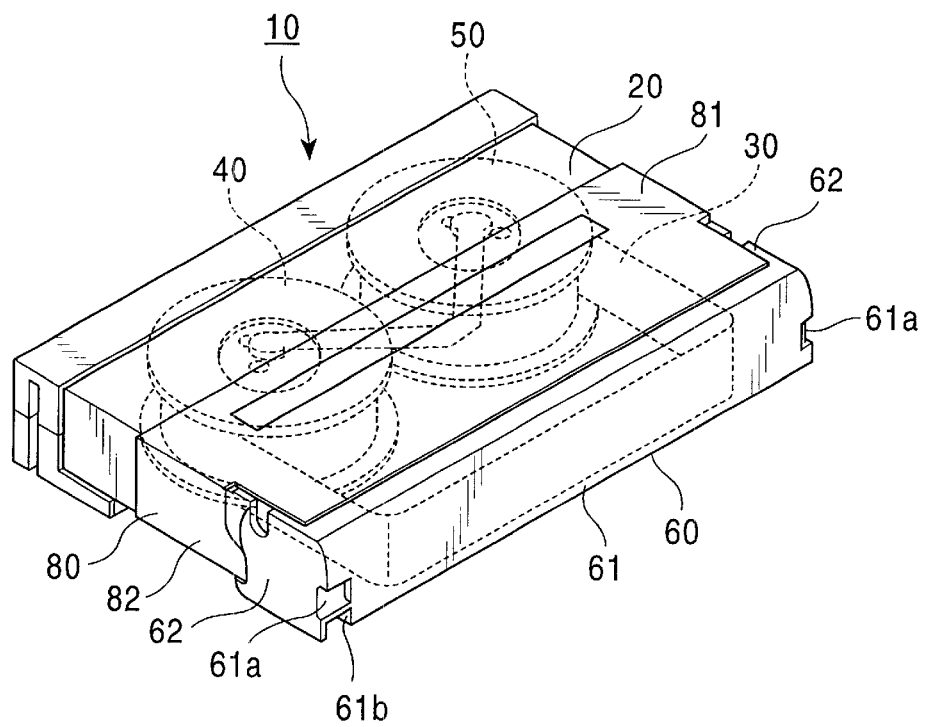
FIG. 1 is a perspective view of a tape cassette used in a recording/playback apparatus comprising a cassette holder according to the present invention which shows the state in which the front lid is in a closed position.
Figure 2:
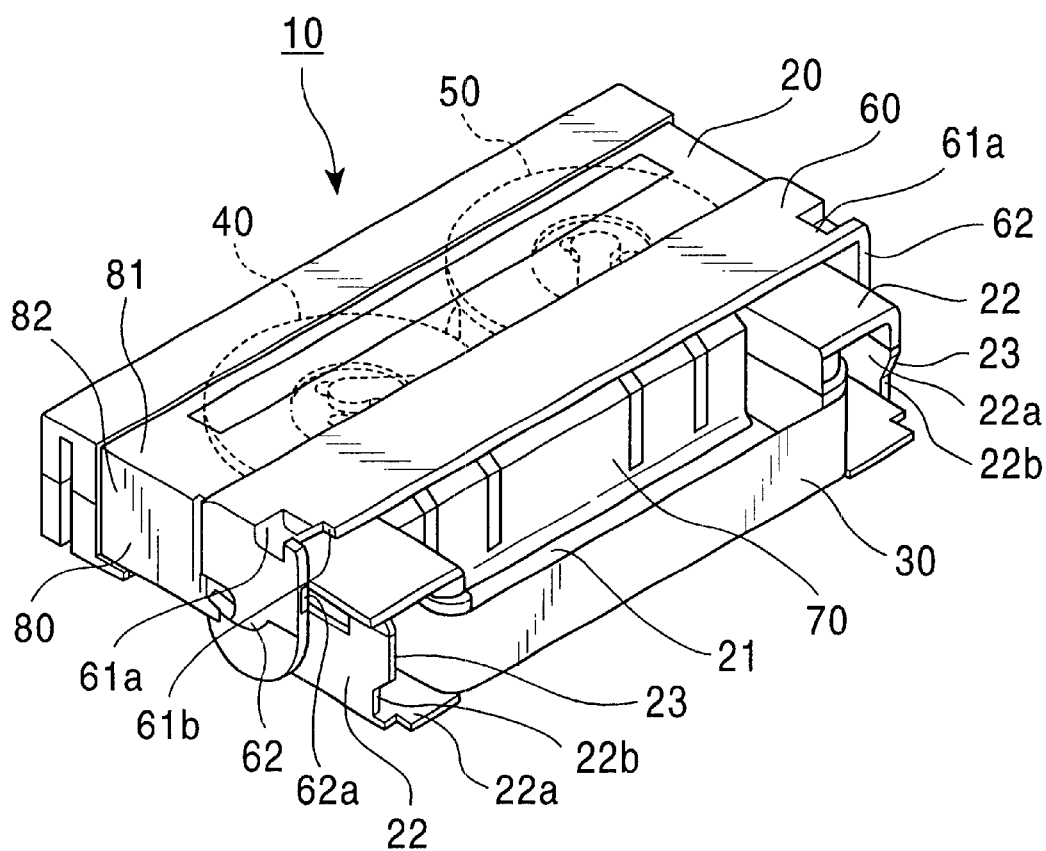
FIG. 2 is a perspective view showing the state in which the front lid is in an open position.
Figure 3:
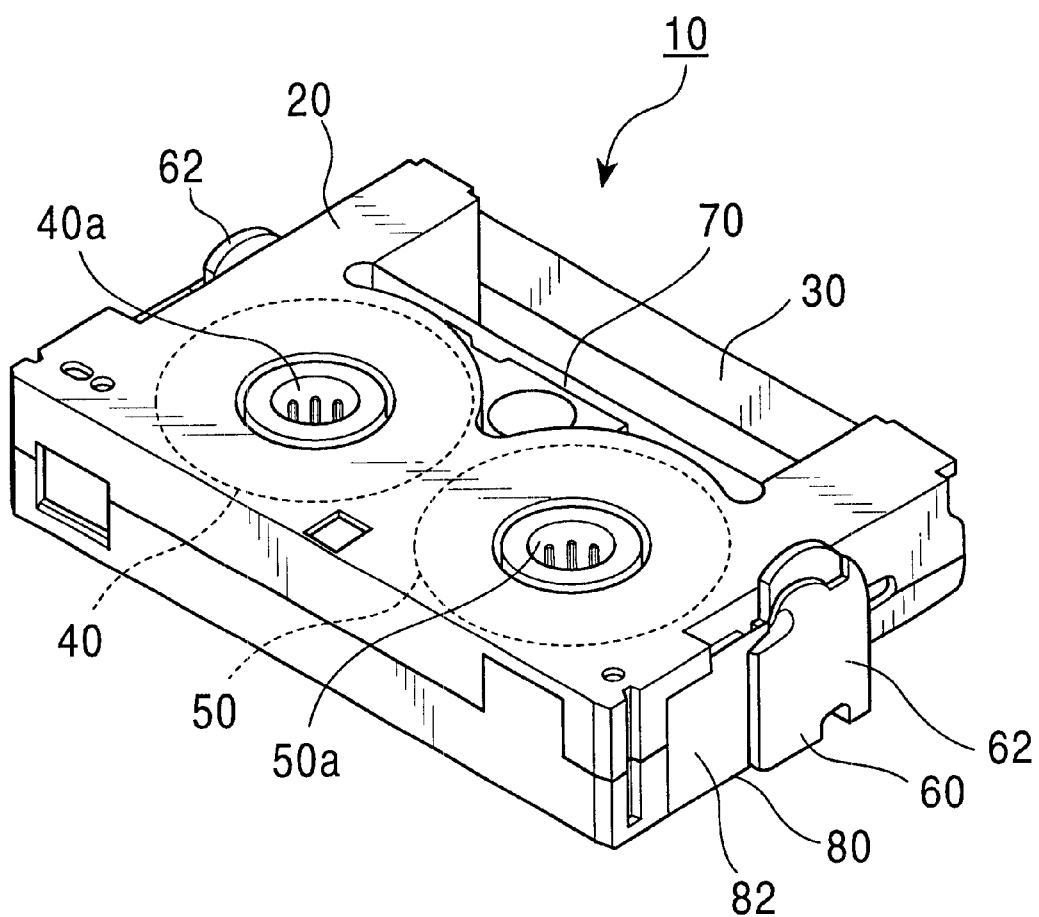
FIG. 3 is a perspective view showing the state in which the front lid is in the open position, as viewed from below.

An embodiment of a cassette holder according to the present invention will now be described with reference to the accompanying drawings.

First, a tape cassette which may be used in a recording/playback apparatus including the cassette holder of the present invention will be described.

In a tape cassette 10, tape reels 40 and 50 having wound therearound a magnetic tape 30 serving as a tape-like recording medium are rotatably accommodated in a thin and box-like cassette shell 20. The tape cassette 10 includes a front lid 60 located along the front of the cassette shell 20 for covering the front of the magnetic tape 30 and a back lid 70 for covering the back of the magnetic tape 30. The back lid 70 is integrally formed with a slider 80 that is supported on the cassette shell 20 so as to be movable back and forth, and the front lid 60 is rotatably supported on the slider 80.

The cassette shell 20 is shaped like a thin box, and is formed of plastic. A large recess 21 called a "mouth" is formed at the front of the cassette shell 20. The mouth 21 opens forwardly, upwardly, and downwardly.

Both sides of the mouth 21 in the cassette shell 20 are shaped like rectangular tubes so as to form tape-drawing sections 22 and 22, and front ends 22a and 22a of the tape drawing sections 22 and 22 are open. The magnetic tape 30 is drawn to the outside from the open front ends 22a and 22a, and is stretched between the front ends 22a and 22a in such a manner as to traverse the front of the mouth 21.

Approximately the upper halves of portions 22b and 22b in the front end surfaces of the tape drawing sections 22 and 22 located outside are formed with forward projecting cams 23 and 23.

Reel base insertion holes (not shown) are formed in a bottom plate of the cassette shell 20. When the tape cassette 10 is mounted in the recording/playback apparatus, reel bases 131 and 131 provided in the recording/playback apparatus are inserted into the cassette shell 20 through the reel base insertion holes 24 and 24, and engaging shafts provided on the reel bases are engaged with reel base engaging holes 40a and 50a that are formed in the tape reels 40 and 50 so as to be open downwardly.

The slider 80 is formed of a thin metal plate. The slider 80 consists of a top face 81 shaped like a long plate in a crosswise direction that is integrally formed with side face projecting downward from both side edges of the top face 81. The side faces consist of principal faces 82 and 82 formed from the portion slightly forward from the center in a longitudinal direction to the rear end, and lidsupporting sections 83 and 83 formed forward from the principal faces 82 and 82.

The lid-supporting sections 83 and 83 are located slightly inward from the principal faces 82 and 82, and the vertical widths thereof are approximately half those of the principal faces 82 and 82. The lid-supporting sections 83 and 83 are formed with substantially semi-circular shaftholding parts 83a and 83a that are opened downward. The back lid 70 is suspended downward from the front edge of the top face 81.

The front lid 60 consists of a front face 61 shaped like a long belt in a substantially crosswise direction that is integrally formed with side faces 62 and 62 projecting backward from both side edges of the front face 61. The upper end of the front face 61 is gradually curved upward so that the front lid 60 can be displaced backward.

Thick-walled sections 63 and 63 are formed on portions of the inner surfaces of the side faces 62 and 62 contacting connections between the side faces 62 and 62 and the front face 61, and control faces 64 and 64 forming arcuate faces as viewed from the side are formed on the thick-walled sections 63 and 63. Rotation fulcrum shafts 65 and 66 are provided projectingly on substantially central parts of the inner surfaces of the side faces 62 and 62 at portions opposing the control faces 64 and 64. The regulating faces 64 and 64 are formed on the arcuate faces around the rotation fulcrum shafts 65 and 66.

A downwardly open recess 62a is formed at the lower end of the inner surface of the left side face 62.

A supporting shaft 67 is provided projectingly at a position downward and to the back from the rotation fulcrum shaft 65 formed on the inner surface of the left side face 62.

Furthermore, engaging recesses 61a and 61a, opening forwardly and sidewardly, are formed at both ends of the front face 61 at positions toward the lower ends, and an insertion cutout 61b is formed near the left end of the lower edge of the front face 61.

The rotation fulcrum shafts 65 and 66 of the front lid 60 are rotatably engaged with the shaft-holding portions 83a and 83a of the slider 80, whereby the front lid 60 is rotatably supported on the lid-supporting sections 83 and 83 formed at the front end of the slider 80.

A lid-locking member 90 is attached to the inside of the left side face 62 of the front lid 60. The lid-locking member 90 is formed to be thin and long overall, and a supporting hole 91 is formed in the center thereof. The supporting shaft 67 formed on the left side face 62 of the front lid 60 is inserted through the supporting hole 91, whereby the lid-locking member 90 is rotatably supported on the side face 62.

When the lid-locking member 90 is in a position sloping down to the right as viewed from the left (see FIG. 9), a latching pawl 92 projecting substantially to the front is formed at the upper end of the lid-locking member 90, and the latching pawl 92 can be latched to the upper surface of a sliding projection 83b formed on the left lid-supporting section 83 of the slider 80 from behind. At a portion between the supporting hole 91 and the lower end of the lid-locking member 90, a surface of the lid-locking member 90 opposite to the surface opposing the side face 62 is cut out to form a spring-retaining surface 93. Furthermore, a portion 94 in front of the lower end surface of the lidlocking member 90 is formed in an arcuate face. Moreover, a locking pin 95 is provided projectingly on the left side face of a portion of the lid-locking member 90 toward the lower end, that is, on the surface opposing the side face of the front lid 60. The locking pin 95 is located within the recess 62a formed in the left side face 62 of the front lid 60.

The provision of a torsion spring 100 urges the front lid 60 and the lid-locking member 90 in predetermined directions, respectively.

A coiled part 101 of the torsion spring 100 is externally fitted to the rotation fulcrum shaft 65 formed on the left side face 62 of the front lid 60. One arm piece 102 of the torsion spring 100 is elastically brought into contact with the upper surface of a sliding projection 83b formed on the left lid-supporting section 83 of the slider 80 from the front, and the other arm piece 103 is elastically brought into contact with the spring-retaining surface 93 of the lid-locking member 90 (see FIG. 9). This allows the lid-locking member 90 to be urged in a clockwise direction as viewed from the left, and the front lid 60 is urged in a clockwise direction as viewed from the left via the lid-locking member 90 and the supporting shaft 67, that is, in a lid-closing direction to close the front of the mouth 21 by the front face 61.

While the lid-locking member 90 locks the opening of the front lid 60 as described above, the lid-locking member 90 also presses the front lid 60 and the slider 80 by a force of the torsion spring 100, so that play or looseness in the front lid 60 and the slider 80 is absorbed.

A recording/playback apparatus 110 includes a main chassis 120, a sliding chassis 130, a moving frame 140, and a cassette holder 150.

The main chassis 120 includes principal devices, such as a rotary head drum 121, and tape drawing guides 122 and 122, for drawing out the magnetic tape 30 from the cassette shell 20 and forming a predetermined tape path to move the magnetic tape 30 thereon.

The sliding chassis 130 is located in front of the main chassis 120, and is supported to be movable back and forth relative to the main chassis 120. The sliding chassis 130 is constructed so that the tape cassette 10 is mounted thereon, and is provided with reel bases 131 and 131 for rotating the tape reels 40 and 50 by engagement therewith.

The moving frame 140 includes a top face 141 shaped substantially like a square frame, and side plates 142 and 142 projected downward from both side edges of the top face 141. The rear ends of the side plates 142 and 142 are rotatably supported on the rear end of the main chassis 120, and are urged upward by the torsion spring 143. The side plates 142 and 142 are formed with guide slits 142a and 142a extending in a longitudinal direction.

In the cassette holder 150, nearly the front halves of the upper ends of side plates 151 and 151 of the cassette holder 150 are connected by a front top plate 152, and the rear ends of the side plates 151 and 151 are connected by a rear end top plate 153. An upwardly projected lid-pressing piece 154 is formed on the central part of the rear edge of the front top plate 152. Backing plates 155 and 155 project from the lower edges of the side plates 151 and 151 so as to approach each other.

The cassette holder 150 is supported on the moving frame 140 so as to be movable in a longitudinal direction.

Sliding pins 156 and 156 provided projectingly on the side plates 151 and 151 for supporting the cassette holder 150 on the moving frame 140 are slidably engaged with the guide slits 142a and 142a of the moving frame 140.

Ends of rotary links 160 and 160 are rotatably connected to portions of the side plates 151 and 151 projecting from the lower edges of the side plates 142 and 142 of the moving frame 140, and the other ends of the rotary links 160 and 160 are rotatably supported on a front plate 132 attached to the front end of the sliding chassis 130.

The cassette holder 150 is provided with lid openers 170 and 170 as means for moving the front lid 60 and the back lid 70 to open positions.

The lid openers 170 and 170 are formed as long arms, and the upper ends thereof are rotatably supported on the upper ends of the inner surfaces of the side plates 151 and 151. Engaging projections 171 and 171 are provided on the inner surfaces of the rotating ends of the lid openers 170 and 170. Coiled parts 181 and 181 of torsion springs 180 and 180 are externally fitted to rotation axes 172 and 172 of the lid openers 170 and 170, arms 182 and 182 of the torsion springs 180 and 180 are elastically brought into contact with spring-retaining pieces 151a and 151a, which are formed by projecting parts of the side plates 151 and 151 inward in the shape of raised portions, from above, and the other arms 183 and 183 are elastically brought into contact with front edges of the lid openers 170 and 170 at positions toward the rotation fulcrums. This allows the lid openers 170 and 170 to be urged in a clockwise direction as viewed from the left (see FIG. 9). The portions of the lid openers 170 and 170 toward the upper ends contact the spring-retaining pieces 151a and 151a, whereby the lid openers 170 and 170 are held in vertical positions in which the rotating ends thereof are located at lower ends.

An unlocking cam 190 is provided at a portion of the left backing plate 155 corresponding to the position of the lid opener 170. An end face of the unlocking cam 190 on the side of insertion of the tape cassette 10 is an inclined portion 191. The width of the unlocking cam 190 is formed slightly smaller than the width of the insertion cutout 61b formed in the front face 61 of the front lid 60.

The operation of the tape cassette 10 will now be described.

Figure 4:
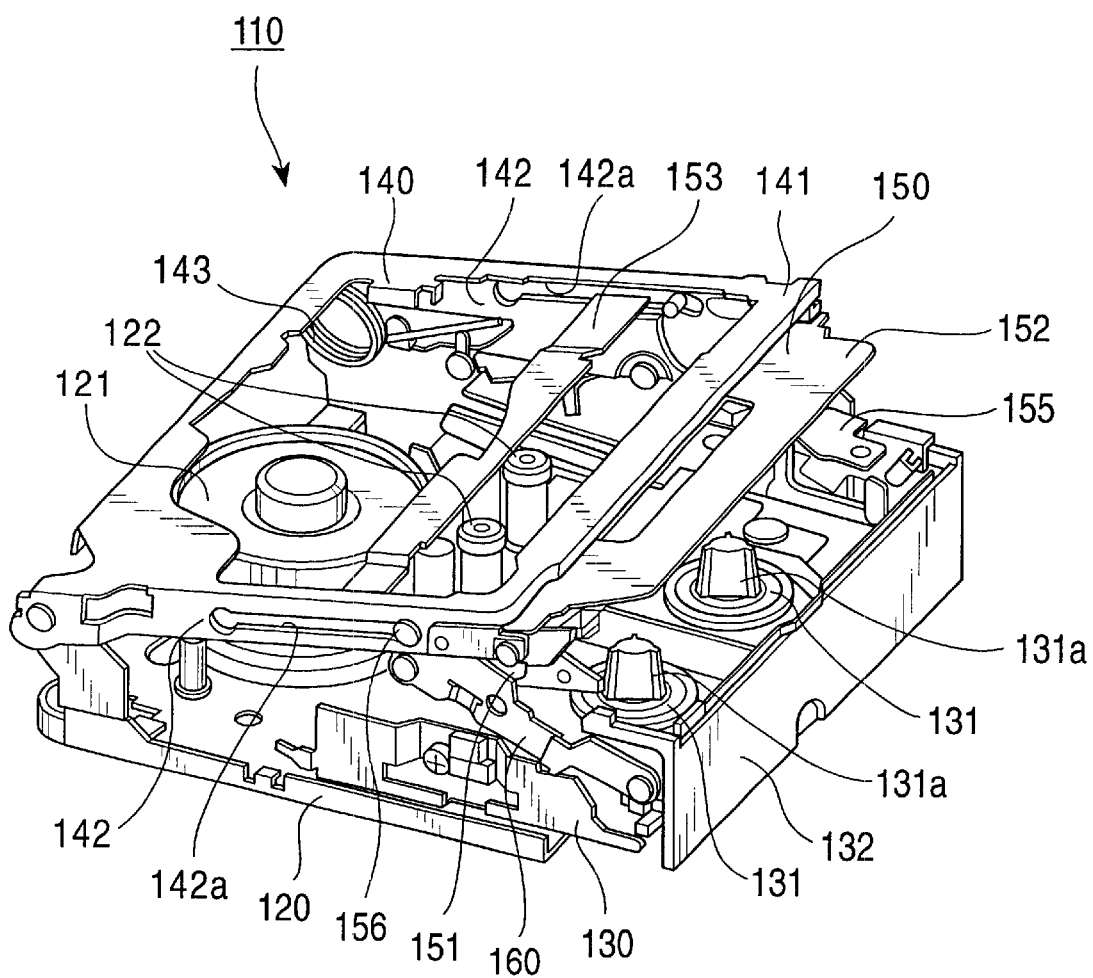
FIG. 4 is a perspective view of a recording/playback apparatus comprising the cassette holder according to the present invention, which schematically shows the state in which the cassette holder is in the eject position.
Figure 5:
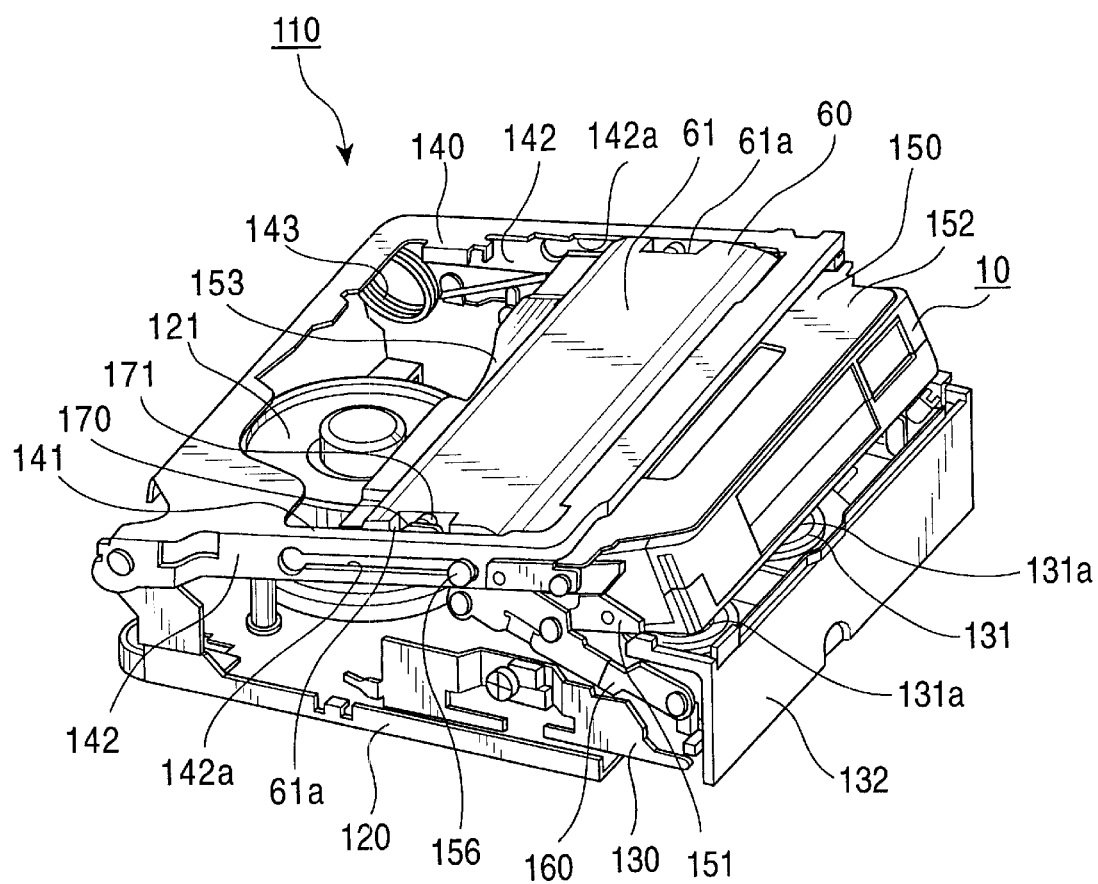
FIG. 5 is a perspective view showing the state in which a tape cassette is inserted into the cassette holder in the eject position.
Figure 6:
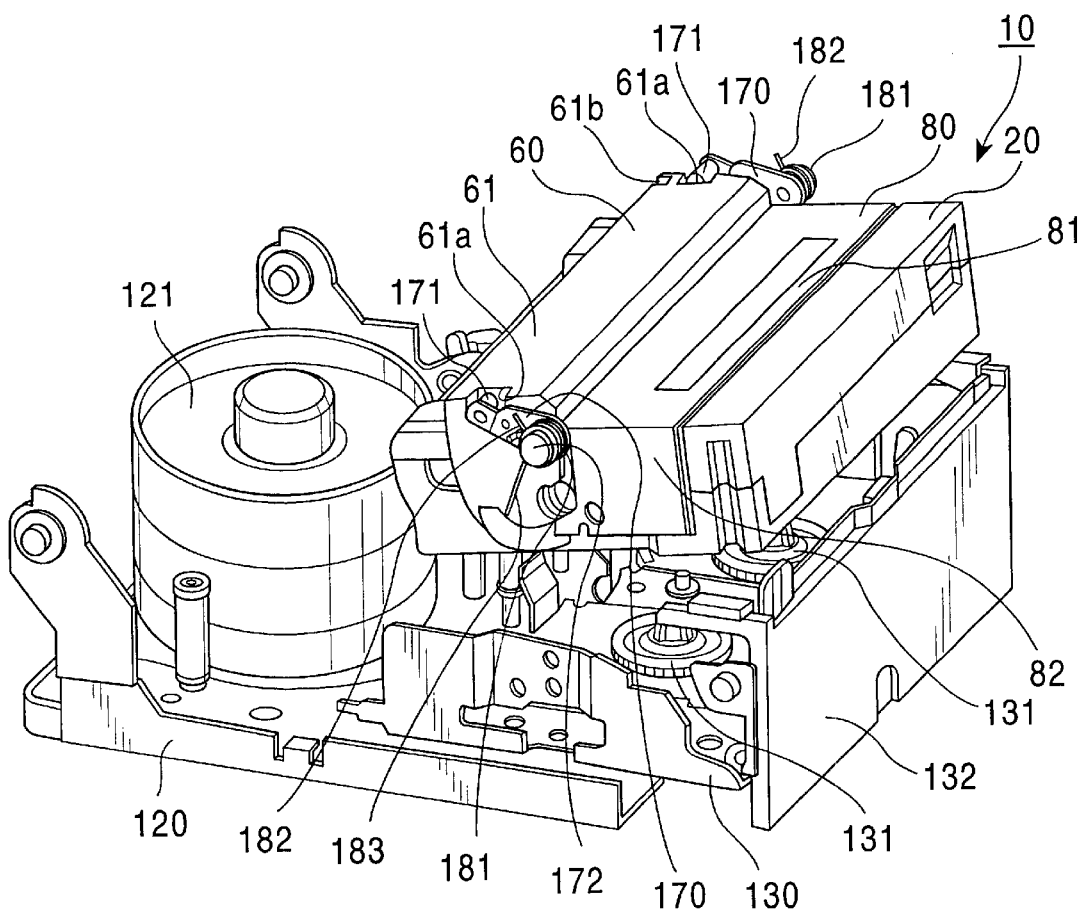
FIG. 6 is a partially cutaway perspective view showing the state in FIG. 5.
Figure 9:
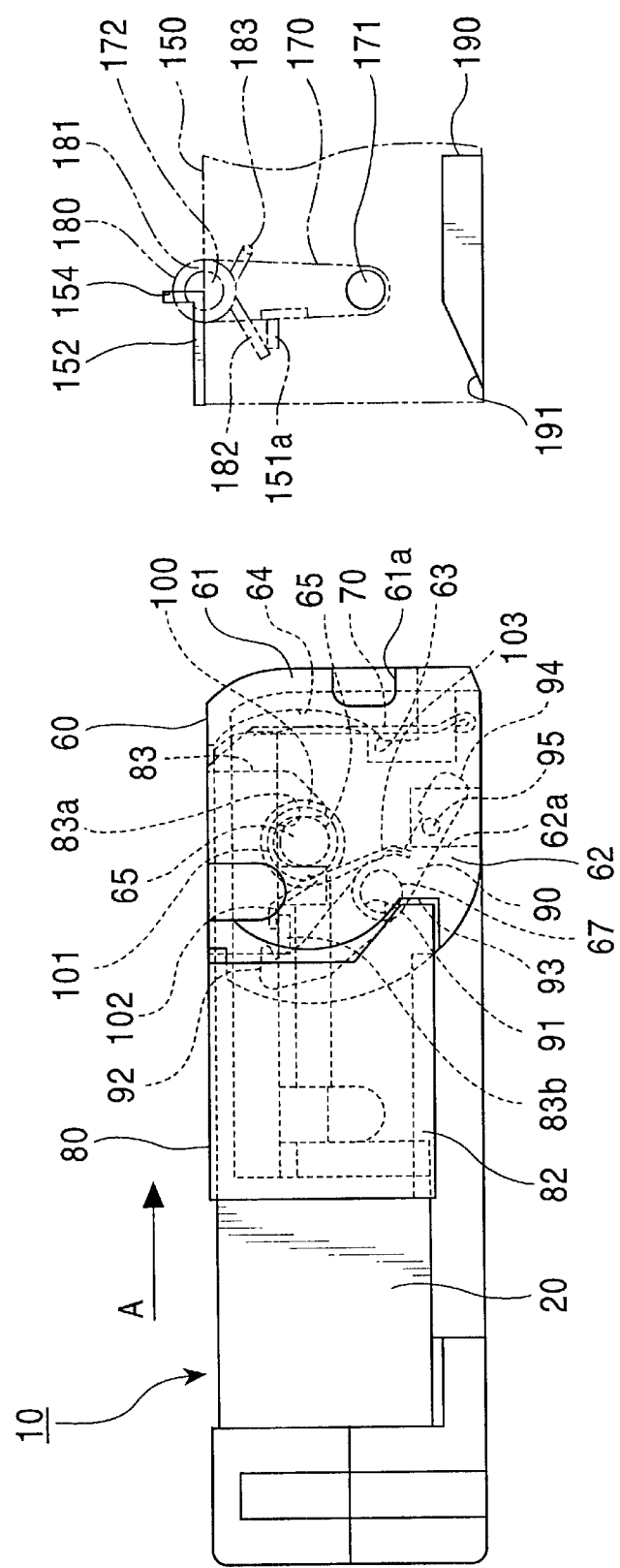
FIG. 9 is a partially cutaway left side view schematically showing a principal part of a tape cassette in the state in which the tape cassette is beginning to be inserted into the cassette holder.
Figure 10:
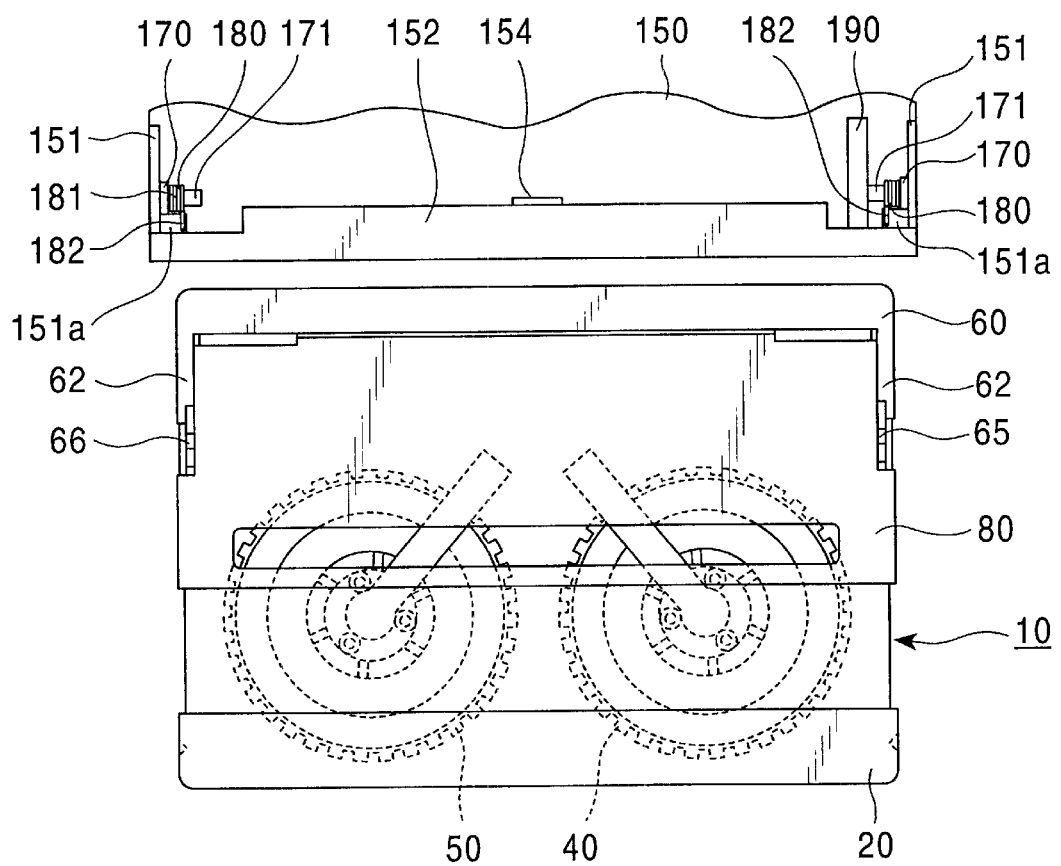
FIG. 10 is a plan view schematically showing the state in which the tape cassette is beginning to be inserted into the cassette holder.

When the moving frame 140 is rotated upward to move the cassette holder 150 to an eject position shown in FIG. 4 in a state where the sliding chassis 130 is in a removal position of the tape cassette, and the tape cassette 10 is inserted into the cassette holder 150 from the front, that is, from the side of the front lid 60 in the direction of the arrow A in FIG. 9 in that state, the unlocking cam 190 is inserted inside the front lid 60 from the insertion cutout 61b formed in the front face 61 of the front lid 60 (see FIG. 9).

Figure 11:
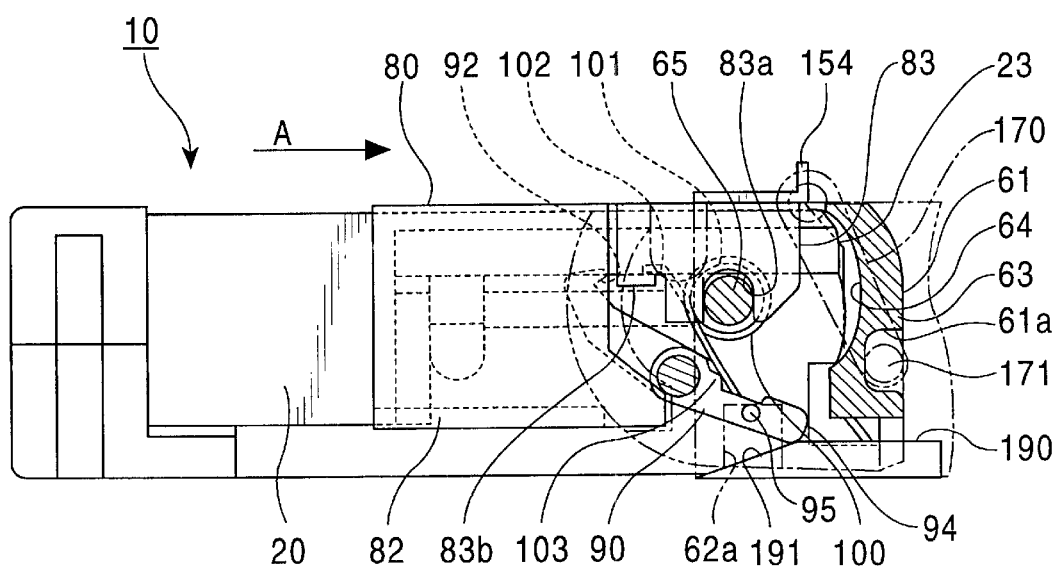
FIG. 11 is a partially cutaway left side view schematically showing a principal part of the tape cassette in the state in which the front lid, which was locked by a lid-locking member, is unlocked.

Then, the engaging projections 171 and 171 of the lid openers 170 and 170 engage with the engaging recesses 61a and 61a of the front lid 60, and the lower end arcuate surface 94 of the lid-locking member 90 slides upward on the inclined portion 191 of the unlocking cam 190, whereby the lid-locking member 90 is rotated in a counterclockwise direction in FIG. 11 and the latching pawl 92 is disengaged from the sliding projection 83b of the slider 80. Therefore, the front lid 60 is unlocked from a lid-closing position.

Figure 12:
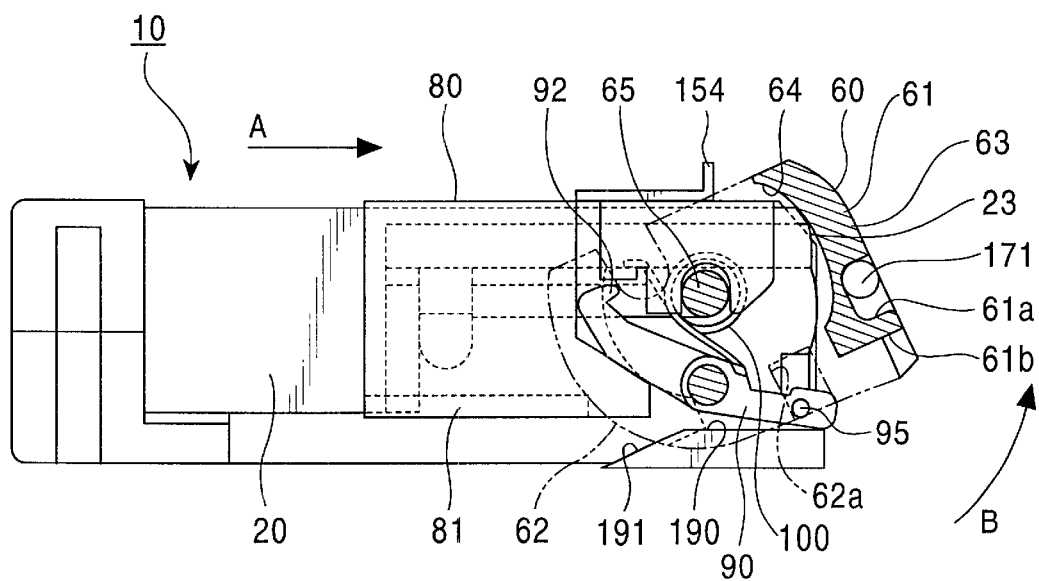
FIG. 12 is a partially cutaway left side view schematically showing a principal part of the tape cassette in the state subsequent to the state in FIG. 11.

When the tape cassette 10 is further inserted into the cassette holder 150, that is, when it is moved in the direction of the arrow A in FIG. 12, the engaging projections 171 and 171 formed at the rotating ends of the lid openers 170 and 170 are pressed in the direction of the arrow A, so that the lid openers 170 and 170 are rotated in a counterclockwise direction in FIG. 12, that is, in the direction of the arrow B in the figure. Therefore, the engaging projections 171 and 171 move upward, and the front lid 60, engaging with the engaging projections 171 and 171 and the engaging recesses 61a and 61a, is rotated in a counterclockwise direction, that is, in the direction of the arrow B in the figure.

The slider 80 receives a force via the front lid 60 for being moved backward relative to the cassette shell 20 by the engaging projections 171 and 171 of the lid openers 170 and 170. The slider 80, however, cannot move backward relative to the cassette shell 20 due to the contact of the control faces 64 and 64 and the cams 23 and 23 of the cassette shell 20, and only the front lid 60 is rotated upward (see FIGS. 11 and 12).

In the states shown in FIGS. 11 and 12, the locking pin 95 of the lid-locking member 90 contacts the rear inner surface of the recess 62a formed in the left side face 62 of the front lid 60, and the locking pin 95 is pulled by the rear inner surface of the recess 62a in the direction of the arrow B as the front lid 60 is further rotated in the direction of the arrow B, whereby the lid-locking member 130 is also rotated in the direction of the arrow B.

Figure 13:
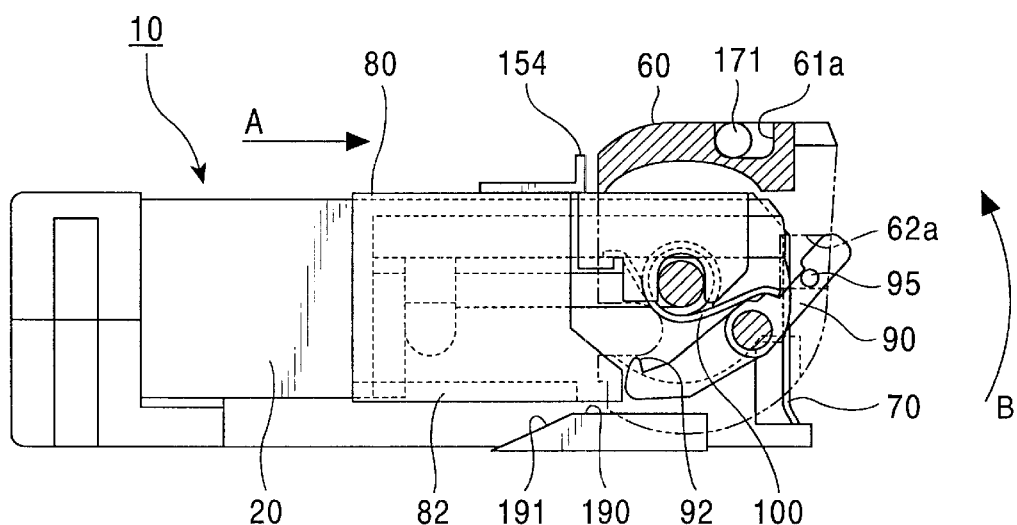
FIG. 13 is a partially cutaway left side view schematically showing a principal part of the tape cassette in the state in which the front lid arrives at the open position.

When the front lid 60 is rotated by 90 degrees in the direction of the arrow B from the initial state (lid-closed state shown in FIG. 9), the control faces 64 and 64 of the front lid 60 are disengaged from the cams 23 and 23 of the cassette shell 20 (see FIG. 13), and the slider 80 can move backward relative to the cassette shell 20. In the state shown in FIG. 13, the lid-pressing piece 154 formed on the front top plate 152 of the cassette holder 150 approaches the upper end of the front face 61 of the front lid 60 from behind.

When the tape cassette 10 is further moved to the inner part of the cassette holder 150, that is, in the direction of the arrow A, the front lid 60 and the slider 80 on which the front lid 60 is supported cannot move in the direction of the arrow A due to the engagement of the engaging projections 171 and 171 of the lid openers 170 and 170 with the engaging recesses 61a and 61a. Therefore, the slider 80 and the front lid 60 move backward relative to the cassette shell 20. Of course, the back lid 70 moves backward relative to the cassette shell 20.

Figure 14:
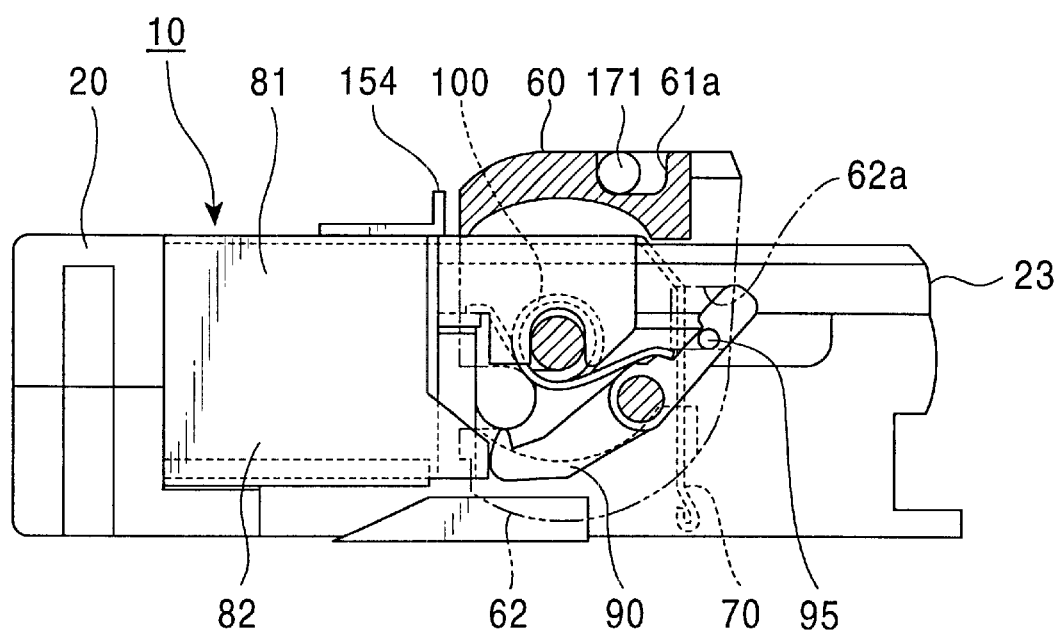
FIG. 14 is a partially cutaway left side view schematically showing a principal part of the tape cassette in the state in which a slider is retracted, and the front lid and the back lid arrive at open positions.

Then, the insertion of the tape cassette 10 into the cassette holder 150 is completed (see FIG. 14).

Since the front lid 60 is elastically brought into contact with the top face of the cassette shell 20, the urging force of the torsion spring 180 does not act to levitate the cassette shell 20 from the cassette holder 150. That is, the urging force of the torsion spring 180 only acts to bring the front lid 60 into contact with the top face of the cassette shell 20.

Figure 7:
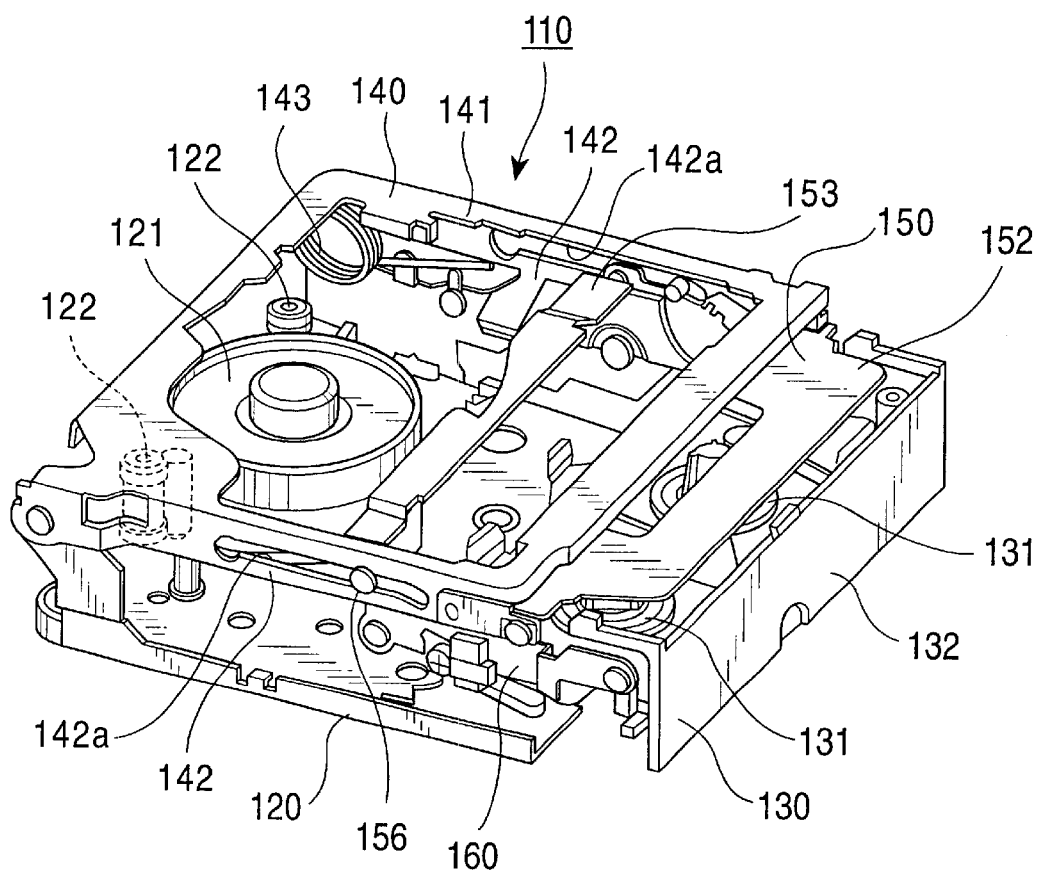
FIG. 7 is a perspective view schematically showing the state in which the cassette holder moves downward and a sliding chassis is in a removal position of a tape cassette.

Upon insertion of the tape cassette 10 into the cassette holder 150 to a completely inserted position, the moving frame 140 is rotated downward, and the cassette holder 150 also moves downward. When the cassette holder 150 moves downward to the lowermost end of the range of downward movement thereof (see FIG. 7), the reel bases 131 and 131 provided on the sliding chassis 130 are inserted into the cassette shell 20 from the reel base insertion holes, and the reel engaging shafts 131a and 131a of the reel bases 131 and 131 engage with the reel base engaging holes 40a and 50a of the tape reels 40 and 50. In addition, tape-drawing guides 122 and 122, pinch rollers (not shown) and the like are located within the mouth 21.

Figure 8:
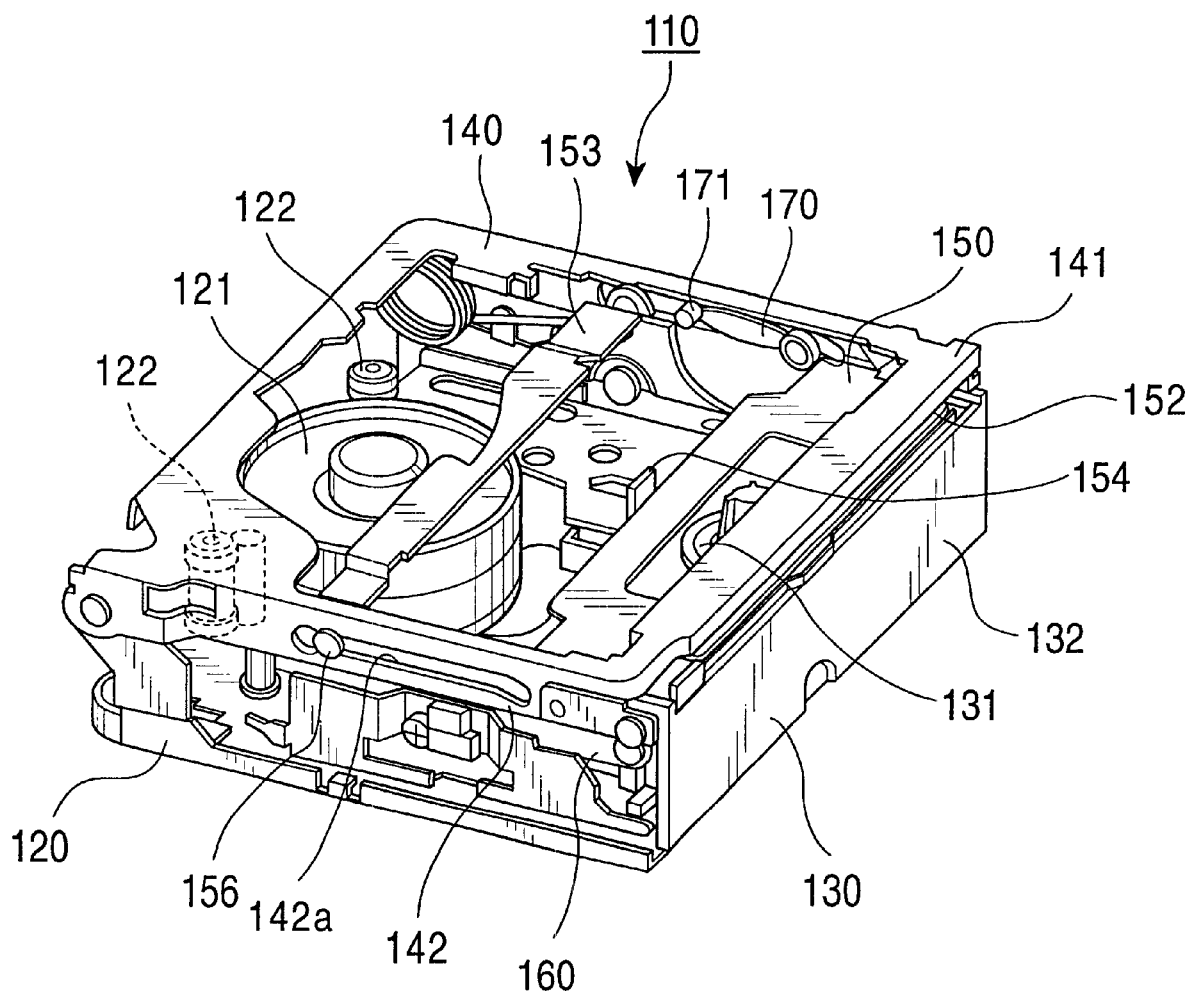
FIG. 8 is a perspective view schematically showing the state in which the sliding chassis is retracted into a recording/playback position.

Then, the slide chassis 130 moves to an inner part of the main chassis 120 to arrive at a predetermined retracted position (see FIG. 8).

When the slide chassis 130 arrives at the retracted position, the tape-drawing guides 122 and 122, and the pinch rollers move to predetermined positions to draw the magnetic tape 30 out of the cassette shell 20, the magnetic tape 30 is wound around the rotary head drum 121 at a predetermined winding angle, and a predetermined tape path is formed.

Upon completion of the recording or the playback of the magnetic tape 30, tape-drawing guides 122 and 122, the pinch rollers, and the like move to the mouth 21, and the excess magnetic tape 30 is taken up by the tape reel 40.

Then, the slide chassis 130 is returned to the removal position of the tape cassette, the moving frame 140 is rotated upward, and the cassette holder 150 is located in the eject position.

Figure 15:
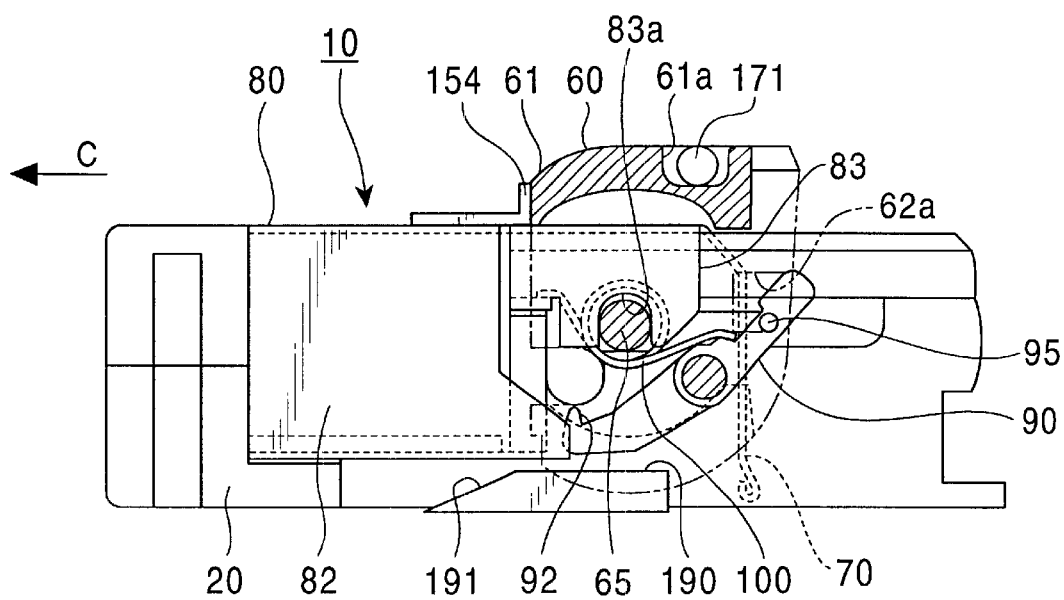
FIG. 15 is a partially cutaway left side view schematically showing a principal part of the tape cassette in the state in which the tape cassette is beginning to be removed from the cassette holder.

When a portion of the tape cassette 10 projecting from the front end of the cassette holder 150 is grasped so as to be removed from the cassette holder 150, the tape cassette 10 is moved in a removal direction, i.e., in the direction of the arrow C (see FIG. 15).

When the tape cassette 10 is moved in the direction of the arrow C, the lid-pressing piece 154 provided on the central part of the front top plate 152 of the cassette holder 150 presses the central part of the upper end of the front face 61 of the front lid 60 in the direction opposite to the direction of the arrow C, whereby the front lid 60 and the slider 80 (and also the back lid 70) are moved toward the front end of the cassette shell 20. In this case, since the front lid 60 is pressed at the central part of the upper end of the front face 61, a force for moving the front lid 60 is evenly applied at both sides of the front lid 60.

Figure 16:
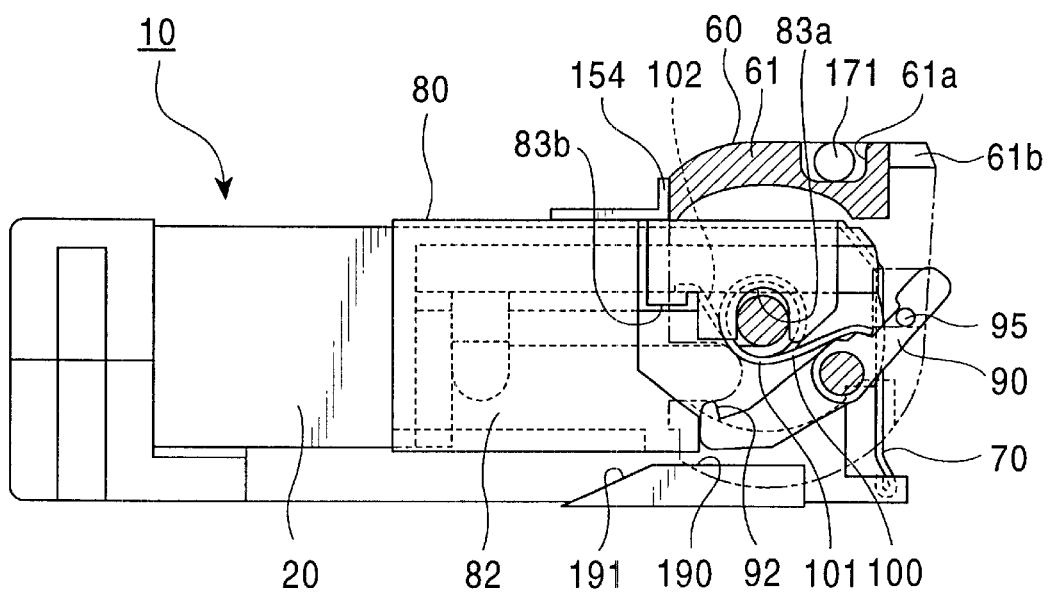
FIG. 16 is a partially cutaway side elevation schematically showing a principal part of the tape cassette in the state in which the slider arrives at the frontmost end of the range of movement thereof.

When the slider 80 arrives at the frontmost end of the range of movement thereof (see FIG. 16), the lower ends of the thick-walled sections 63 and 63 are removed from the top face of the cassette shell 20, so that the front lid 60 will be brought in a downwardly rotatable state. The front lid 60 is rotated downward by the urging force of the torsion spring 100 applied via the lid-locking member 90, and arrives at the lid-closing position to cover the magnetic tape 30 in association with the advancing back lid 70. Then, the latching pawl 92 of the lid-locking member 90 engages with the upper surface of the sliding projection 83b of the slider 80, and the tape cassette 10 is removed from the cassette holder 150.

In the above cassette holder 150, by the provision of a simple mechanism so that the cassette holder 150 is provided with the lid-pressing piece 154, the front lid 60 can be moved forward when the tape cassette 10 is removed from the cassette holder 150. Furthermore, since the lid-pressing piece 154 presses the central part of the front lid 60, a force for moving the front lid 60 forward is evenly applied at both sides of the front lid 60, whereby the front lid 60 is moved forward in a stable manner.

The form and structure of each component part used in the above-described embodiment is only one example thereof for carrying out and embodying the present invention. Therefore, the aforementioned forms and structures are not to be construed as limiting the technical scope of the present invention.

As will be apparent from the above description, in one form of the present invention, there is provided a cassette holder for inserting therein a tape cassette formed so that a front lid for opening and closing the front of a part of a tape-like recording medium located so as to traverse the front of a cassette shell accommodating therein tape reels having wound therearound the tape-like recording medium, the front lid rotatable upward and movable rearward when the lid is opened to open the front of the tape-like recording medium, the cassette holder for mounting the tape cassette in a predetermined mounting position in a recording/playback apparatus, the cassette holder comprising a lid-pressing member for pressing forward an end of the front lid when the tape cassette is to be removed from the cassette holder. This form of the invention offers the following advantages. By the provision of simple mechanism so that the cassette holder is provided with the lid-pressing piece, the front lid can be moved forward when the tape cassette is removed from the cassette holder. Furthermore, since the lidpressing piece presses the central part of the front lid, a force for moving the front lid forward is evenly applied at both sides of the front lid, whereby the front lid is moved forward in a stable manner.

What is claimed is:

1. A cassette holder for inserting therein a tape cassette formed so that a front lid for opening and closing the front of a part of a tape-like recording medium located so as to traverse the front of a cassette shell accommodating therein tape reels having wound therearound the tape-like recording medium, the front lid rotatable upward and movable rearward when the lid is opened to open the front of the tape-like recording medium, the cassette holder for mounting the tape cassette in a predetermined mounting position in a recording/playback apparatus, the cassette holder comprising a lid-pressing member for pressing forward an end of the front lid when the tape cassette is to be removed from the cassette holder, wherein the lidpressing member is integrally formed with the cassette holder, the lid-pressing member presses the central part of the front lid, the cassette holder is provided with an unlocking cam, and the lid-pressing member is arranged at an upper portion of the cassette holder opposing the unlocking cam across the tape cassette.

2. A cassette holder according to claim 1, wherein the unlocking cam is provided with an inclined portion, and the lid-pressing member is arranged at an upper portion of the unlocking cam opposing the uppermost position of the inclined portion.

3. A cassette holder according to claim 2, further comprising a rotatable lid opener for opening and closing the front lid, wherein a rotation fulcrum of the lid opener is provided in the vicinity of the lid-pressing member.

4. A cassette holder according to claim 3, wherein a recess is formed in the front lid, and a projection of the lid opener engages with the recess to thereby rotate the front lid to be moved close to the lid-pressing member.

* * * * *

UNITED STATES PATENT AND TRADEMARK OFFICE
CERTIFICATE OF CORRECTION

PATENT NO. : 6,441,993 B1
DATED : August 27, 2002
INVENTOR(S) : Shuichi Ota et al.

It is certified that error appears in the above-identified patent and that said Letters Patent is hereby corrected as shown below:

<u>Column 8,</u>
Line 60, "lidpressing" should read -- lid-pressing --.

Signed and Sealed this

Twenty-ninth Day of April, 2003

JAMES E. ROGAN
*Director of the United States Patent and Trademark Office*